Jan. 22, 1963  E. W. BOLLMEIER ETAL  3,074,544
COMBINATION PACKAGE
Filed Dec. 22, 1958
FIG. 1
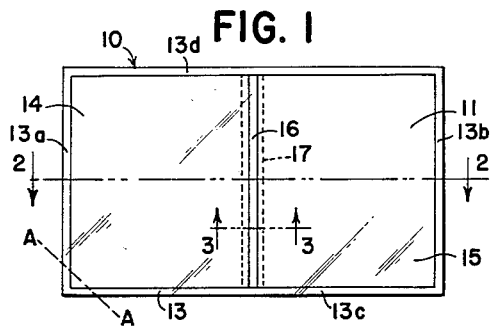
FIG. 2
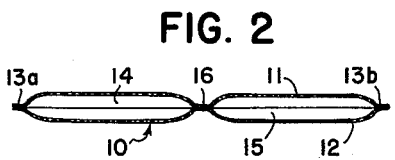
FIG. 3
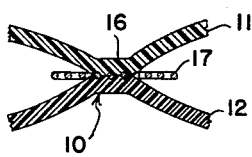
FIG. 5
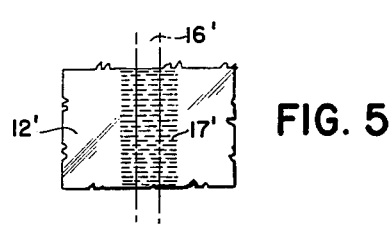
FIG. 6
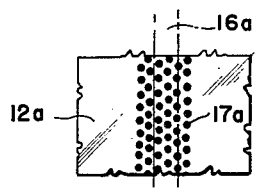
FIG. 4
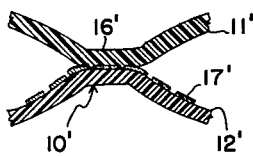
FIG. 7
FIG. 8
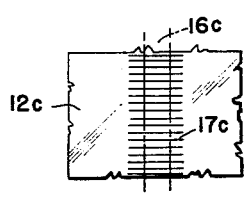
INVENTORS
EMIL WAYNE BOLLMEIER
LEO F. VOKATY
BY
*Carpenter Abbott Coulter & Kinney*
ATTORNEYS United States Patent Office 3,074,544
Patented Jan. 22, 1963

3,074,544
COMBINATION PACKAGE
Emil Wayne Bollmeier, Mendota Heights, and Leo F. Vokaty, Maplewood, Minn., assignors to Minnesota Mining and Manufacturing Company, St. Paul, Minn., a corporation of Delaware
Filed Dec. 22, 1958, Ser. No. 782,038
6 Claims. (Cl. 206—47)

This invention relates to improvements in the art of packaging, and has particular relation to an improved package in the form of an envelope of flexible, thermoplastic sheet material having opposing sidewall portions joined by a seam having as one of its principal attributes a predictable resistance to rupture which is less than the tear strength of the sheet material. The invention also relates to the method of joining sheets in laminate relation along a rupturable seam of the character aforementioned.

The invention has particular utility, for example, in the packaging of inter-reactive materials in a multi-compartment envelope in which at least one internal barrier separating adjacent compartments is sufficiently strong to withstand normal handling and yet is selectively rupturable to form within the envelope a mixing compartment for admixture and initial reaction of the materials from said adjacent compartments. While the invention will be shown and described in connection with packaging affording compartmentalized accommodation and selective admixture of two fluent materials, it is to be expressly understood that the specific forms and application of the invention shown and described have been selected only to facilitate disclosure, and are not intended to unnecessarily limit the scope of the claims or to confine the invention to a particular use.

In the drawing accompanying and forming a part of this specification:

FIGURE 1 is a plan view of a multicompartment package illustrative of one application of the invention;

FIGURE 2 is a cross-sectional view through the package of FIGURE 1 taken approximately along the line 2—2 of FIGURE 1;

FIGURE 3 is an enlarged fragmentary cross-sectional view taken along the line 3—3 of FIGURE 1 and showing one form of rupturable seam according to the present invention;

FIGURE 4 is a view similar to FIGURE 3 showing another form of rupturable seam according to the present invention; and FIGURES 5, 6, 7 and 8 are fragmentary plan views of sheet material to which patterns of seal resist have been applied.

Referring to FIGURES 1 and 2, the package selected for illustration therein takes the form of an hermetically sealed envelope 10 comprising a pair of rectangular sheets 11 and 12 of relatively strong and tough flexible thermoplastic material, for example polymeric material, said sheets being peripherally sealed to each other by a mechanically strong heat seal 13. The envelope 10 is separated into two sealed compartments 14 and 15 by a predictably rupturable seam 16 joining the sheets 11 and 12 and extending transversely across a medial portion thereof from the portion of seal 13 at one edge to the portion thereof at the opposite edge.

In a typical use of the envelope 10 the compartments 14 and 15 contain inter-reactive materials, for example a liquid epoxy resin in one, and a stable liquid mixture of a curing agent and an activator for the epoxy resin in the other. The seam 16 must be sufficiently strong to maintain a seal between the compartments during all normal handling, yet its resistance to rupture must be substantially less than that of the peripheral seal 13 and also substantially less than the tear strength of the sheets 11 and 12. The reason for this is to separately accommodate the inter-reactive materials until there is a need for the reaction product of the two, at which time the seam 16 can be readily ruptured without impairing the seal 13, to permit admixture and initial inter-reaction of the materials wholly within the envelope 10 by manual kneading of the envelope. Rupture of the seam 16 is accomplished by gripping the sheets 11 and 12 medially of one of the compartments 14 and 15 and jerking or rapidly pulling said sheets apart. Following kneading sufficient to produce a homogeneous mixture within the envelope, the contents thereof may be removed, for example to a waiting mold, by cutting off a corner of the envelope, as indicated by the line A—A in FIGURE 1, to permit the contents to flow or be squeezed therefrom.

The characteristics desired of the seam 16 cannot be produced simply by the application of less heat and pressure than is applied to form the peripheral seal 13 and/or by reducing the width of the area to which the heat and pressure are applied. In spite of accurate control of temperature, pressure and time, the normal variations in film thickness, surface irregularities and other uncontrollable variations preclude the formation of a satisfactory seam 16 on a commercial basis using conventional methods. Conventional methods seem invariably to produce seams which are either too strong to be readily ruptured, or too weak to maintain a satisfactory seal between the compartments during normal handling.

Reduced resistance to rupture is imparted to the seam 16 of the present invention by virtue of masking means creating within said seam substantially uniformly dispersed areas of non-joiner of the sheets 11 and 12 reducing to substantially less than its total area the area of said seam over which joinder of said sheets is effected. This arrangement imparts to each side of the seam 16 an irregular frontal area which defines spaced points at which the rupturing stress is concentrated upon pulling apart of the sheets 11 and 12 as aforedescribed. Rupture is thus accomplished readily and progressively.

The masking means referred to above may take a variety of forms. As shown in FIGURE 3, for example, the masking means may take the form of a porous fibrous web 17 of open tissue-like paper or of non-woven polyester mat interposed between the sheets 11 and 12 and through the openings of which the sheets 11 and 12 are joined, preferably by heat sealing. The material from which the web 17 is made must not bond well to at least one of the sheets 11 and 12 either chemically or mechanically and preferably has approximately 50% through openings therein, but this percentage may vary substantially within the inventive concept. In the seam 16 of FIGURE 3, the area thereof through which joinder of the sheets 11 and 12 is effected is broken up into small fused islands corresponding to the openings in the web 17, said islands being separated by unfused channels created by the fibers of the web. When stress is applied to separate the seam 16, the stress is concentrated at the islands, permitting progressive rupture from island to island.

In the formation of the envelope 10 the web 17 is interposed between the sheets 11 and 12 transversely of a medial portion thereof. While said sheets are in registry and with the web in laminate relation therebetween, said sheets are heat sealed to each other through the web 17 as well as at the ends thereof, for example by passing the laminate between complementary pressure type rollers having narrow heated peripheral surfaces, to form the seam 16 as well as the portions 13a and 13b of the peripheral seal 13. As shown in FIGURE 3, the seam 16 is substantially narrower than the web 17. The portion 13c of the peripheral seal 13 extending the full length of one longitudinal edge of the sheets 11 and 12 may then be formed by passing the laminate between complementary heated pressure type bars to thereby form a two compartment envelope in which each compartment 14 and 15 has an unsealed peripheral edge portion opposite the seal portion 13c and through which the material to be packaged can be introduced. Envelopes 10 may be supplied in this form to a packager who then fills the compartments 14 and 15 with any desired inter-reactive or non-reactive fluent materials, after which the compartments may be sealed by the formation of the portion 13d of the seal 13 in a manner similar to the manner in which the seal portion 13c was formed.

In the form of the invention shown in FIGURE 4, the masking means takes the form of a seal resisting coating 17' applied in a pattern to the inner surface of one of the sheets 11' and 12', for example, the sheets 12' as shown. The pattern of the seal resist 17' may be as shown in FIGURE 5. By passing the sheets 11' and 12' between heated rollers in the manner described with respect to the formation of seam 16 of FIGURE 3, said sheets are joined by heat sealing in the heated areas not masked by the resist 17'. The areas occupied by the resist 17' define areas of non-joinder of the sheets 11' and 12', such that the masking effect of the resist 17' is not unlike that of the web 17 of FIGURE 3.

The use of the resist 17' offers certain advantages over use of the web 17, in that it may be applied by standard printing techniques. As such, the resist 17' can be applied in an infinite variety of patterns affording any selected ratio of areas of joinder and non-joinder of the sheets 11' and 12' in the seam 16'. FIGURES 6 and 7, for example, illustrate at 17a and 17b respectively, other patterns in which the resist may be applied to a carrier sheet. In FIGURES 5, 6 and 7 the spaces 16', 16a and 16b between the broken lines indicate the approximate width of a seam 16', 16a and 16b respectively for joinder of the sheets. These patterns are illustrative of only a few of the many patterns which may be utilized, however.

The pattern may also be of the type which, like the web 17, is the reverse of the patterns of FIGURES 5, 6 and 7 and affords a matrix of masked area in which small unmasked areas in the form of islands are uniformly dispersed. The pattern may further take the form shown in FIGURE 8 in which the mask 17c includes parallel lines of resist extending completely across the seam area 16c. The pattern of FIGURE 8, like those which are the reverse of the patterns of FIGURES 5 to 7 would provide a seam affording satisfactory sealing between compartments containing material which cannot penetrate the areas of non-joinder of the seam between the unbonded portions of the sheets 11' and 12'. As for materials which can penetrate the unbonded printed areas, such patterns provide a seam which permits restricted fluid communication between compartments in the manner of a strainer or of a series of flow limiting orifices.

The seal resist 17' may be of any suitable material, organic or inorganic, preferably unrelated in chemical structure to the material of the sheets 11' and 12', and which upon formation of the seam 16' will form neither a chemical nor a mechanical bond between said sheets. Aniline printing inks appear to serve well for this purpose and have the advantages of being readily advailable and easy to use. Many other inks or coatings could be used, for example, lacquer, shellac, enamel, low adhesion backsize materials as applied to pressure-sensitive adhesive tape backings, or any other suitable material that leaves a film of solids when dried. As another specific example, the mask could be applied to the surface of one sheet as a highly adherent coating, then dried or otherwise rendered nonadherent to the other sheet.

The envelopes 10 and 10', by virtue of the improved seam construction are markedly superior to known compartmentalized packages intended for a similar purpose. Notwithstanding this superiority, the cost of the envelope 10 and 10' is nominal, two factors contributing thereto being the simplicity of its construction, and the fact that its fabrication can be readily carried out by well known mass production techniques. The utility of the improved predictably rupturable seam construction is not limited to the compartmentalized packages, however. It may be used anywhere that a readily rupturable seal is required. More specifically, the seams 16 and 16' may function as a peripheral seal closing a single compartment package, for example the package which would result upon removal of the portions of the sheets 11 and 12 to the right of the seam 16 in FIGURES 1 and 2. In such a package, three edges of the portions of the sheets 11 and 12 enclosing the compartment 14 are joined by the mechanically strong peripheral seal 13, with the fourth edge closed by the seam 16 affording a predictably rupturable seal.

What is claimed as the invention is:

1. A multiple compartment flexible unitary package for compartmentalized accommodation and selective admixture of at least two fluent materials, comprising a normally flat envelope of strong flexible heat sealable sheet material, two opposing sidewalls of said envelope being joined by heat sealing to form a transversely extending rupturable seam separating the interior of said envelope into individual compartments, said seam including masking means in the form of a substantially uniformly open web interposed between said sidewalls and through the openings of which said sidewalls are heat sealed, said web reducing to substantially less than its total area the area of said seam over which joinder of said sidewalls is effected.

2. A multiple compartment flexible unitary package for compartmentalized accommodation and selective admixture of two materials, at least one of which is fluent, comprising a normally flat envelope of strong flexible heat sealable sheet material having a pair of opposing sidewall portions joined in laminate relation along a transversely extending predictably rupturable seam separating the interior of said envelope into individual compartments, said seam comprising masking means interposed between dispersed areas of said sidewall portions and preventing joinder of said sidewall portions in the areas masked thereby, said sidewall portions being heat sealed to each other by a full strength weld in the unmasked areas of said seam, said masking means reducing to substantially less than its total area the area of said seam over which heat sealed joinder of said sidewalls is effected.

3. A multiple compartment flexible unitary package for compartmentalized accommodation and selective admixture of two materials, at least one of which is fluent, comprising a normally flat envelope of strong flexible heat sealable sheet material having a pair of opposing sidewall portions joined in laminate relation along a transversely extending predictably rupturable seam separating the interior of said envelope into individual compartments, said seam comprising masking means in the form of a substantially uniform pattern of spaced areas of seal resist interposed between dispersed areas of said sidewall portions in the areas masked thereby, said sidewall portions being heat sealed to each other by a full strength weld in the spaces between said areas of seal resist, said seal resist patern reducing to substantially less than its total area the area of said seam over which heat sealed joinder of said sidewalls is effected.

4. A package comprising an envelope of heat sealable flexible sheet material having a pair of opposing sidewall portions joined in laminate relation along a predictably rupturable seam defining a peripheral portion of a compartment for accommodation of material, said seam comprising masking means in the form of a substantially uniform pattern of spaced areas of seal resist interposed between dispersed areas of said sidewall portions and preventing joinder of said sidewall portions in the areas masked thereby, said sidewall portions being heat sealed to each other by a full strength weld in the spaces between said areas of seal resist, said seal resist pattern reducing to substantially less than its total area the area of said seam over which heat sealed joinder of said sidewalls is effected.

5. In combination, a pair of sheets of heat sealable material having portions in laminate relation joined along a predictably rupturable seam comprising masking means in the form of a substantially uniform pattern of spaced areas of seal resist interposed between dispersed areas of said sheet portions and preventing joinder of said sheet portions in the areas masked thereby, said sheet portions being heat sealed to each other by a full strength weld in the spaces between said areas of seal resist, said seal resist pattern reducing to substantially less than its total area the area of said seam over which heat sealed joinder of said sheets is effected.

6. A multiple compartment flexible unitary package for compartmentalized accommodation and selective admixture of two materials, comprising a normally flat envelope of strong flexible heat sealable polymeric sheet material having a pair of opposing sidewalls disposed in laminate relation and heat sealed to each other in a predetermined pattern to define a predictably rupturable seam separating the interior of said envelope into individual compartments, said pattern consisting of a plurality of spaced substantially uniformly distributed weld-free areas in which surface portions of said sidewalls facing each other and in registration are separate, said weld-free areas being separated by weld areas constituting the remainder of said pattern and in which said sidewalls are heat sealed to each other by a full strength weld between initially clean surface portions of said sidewalls, said pattern reducing to substantially less than the total seam area the area of said seam over which heat sealed joinder of said sidewalls is effected.

References Cited in the file of this patent
UNITED STATES PATENTS

| | | |
|---|---|---|
| 2,004,041 | Driver | June 4, 1935 |
| 2,245,738 | Taylor | June 17, 1941 |
| 2,334,600 | Boysen | Nov. 16, 1943 |
| 2,560,535 | Allen | July 17, 1951 |
| 2,756,875 | Yochim | July 31, 1956 |
| 2,771,724 | Hosier | Nov. 27, 1956 |
| 2,810,507 | Saunders | Oct. 22, 1957 |
| 2,916,197 | Detrie et al. | Dec. 8, 1959 |

FOREIGN PATENTS

| | | |
|---|---|---|
| 799,284 | Great Britain | Aug. 6, 1958 |